US010489169B2

(12) United States Patent
Lu et al.

(10) Patent No.: US 10,489,169 B2
(45) Date of Patent: Nov. 26, 2019

(54) METHOD AND DEVICE FOR PERFORMING SUBSET OF FUNCTIONS OF APPLICATION (71) Applicant: BEIJING XIAOMI MOBILE SOFTWARE CO., LTD., Beijing (CN)

(72) Inventors: Yizhan Lu, Beijing (CN); Bo Liu, Beijing (CN); Yuqing Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/987,662

(22) Filed: May 23, 2018

(65) Prior Publication Data
US 2018/0341501 A1 Nov. 29, 2018

(30) Foreign Application Priority Data

May 26, 2017 (CN) .......................... 2017 1 0383765

(51) Int. Cl.
G06F 9/445 (2018.01)
H04L 29/08 (2006.01)
G06F 16/951 (2019.01)

(52) U.S. Cl.
CPC ........ *G06F 9/44526* (2013.01); *G06F 16/951* (2019.01); *H04L 67/34* (2013.01)

(58) Field of Classification Search
CPC ................................................. G06F 9/44526
USPC ....................................................... 717/178
See application file for complete search history.

(56) References Cited

U.S. PATENT DOCUMENTS

| 5,566,327 | A | * | 10/1996 | Sehr | ...................... | G06Q 20/341 |
| 6,473,794 | B1 | * | 10/2002 | Guheen | ................... | H04L 41/22 709/223 |
| 6,606,744 | B1 | * | 8/2003 | Mikurak | ................. | H04L 29/06 717/174 |
| 2003/0101096 | A1 | * | 5/2003 | Suzuki | ................... | G06Q 20/04 705/17 |
| 2009/0013076 | A1 | * | 1/2009 | Phillips | ................ | G06Q 20/123 709/225 |
| 2012/0124061 | A1 | | 5/2012 | Macbeth et al. | | |

(Continued)

FOREIGN PATENT DOCUMENTS

CN 102045205 A 5/2011
CN 102946599 A 2/2013
(Continued)

OTHER PUBLICATIONS

Title: Specification and implementation of dynamic web site benchmarks, author: C Amza et al, published on 2002.*
(Continued)

*Primary Examiner* — Chameli Das
(74) *Attorney, Agent, or Firm* — Arch & Lake LLP (57) ABSTRACT The present disclosure provides a method and device for distributing an application. The method includes: acquiring a card category of a card to be displayed, where the card includes a download entry of the application and is loaded on a preset desktop, and provides a subset of functions of the application; acquiring real-time card information corresponding to the card category according to the card category; and displaying the card in a preset displaying format on the preset desktop based on the real-time card information.

9 Claims, 5 Drawing Sheets (56) References Cited

U.S. PATENT DOCUMENTS

| | | | | |
|---|---|---|---|---|
| 2014/0089241 A1* | 3/2014 | Hoffberg | ............... | G05B 15/02 |
| | | | | 706/14 |
| 2015/0350719 A1* | 12/2015 | Kim | ................. | H04N 21/2362 |
| | | | | 725/32 |
| 2016/0104116 A1* | 4/2016 | Greenberg | .......... | G06Q 10/105 |
| | | | | 705/320 |
| 2016/0196010 A1* | 7/2016 | Sheha | .................... | G06Q 30/02 |
| | | | | 715/780 |

FOREIGN PATENT DOCUMENTS

| | | |
|---|---|---|
| CN | 103607626 A | 2/2014 |
| CN | 106296255 A | 1/2017 |

OTHER PUBLICATIONS

Title: Information animation applications in the capital markets, author: W Wright, published on 1995.*

European Office Action issued in EP Patent Application No. 18174384.0, dated Sep. 18, 2018, 9 pages.

First Chinese Office Action (including English translation) issued in CN Application 201710383765.1, dated Jul. 15, 2019, 14 pages.

* cited by examiner

METHOD AND DEVICE FOR PERFORMING SUBSET OF FUNCTIONS OF APPLICATION

CROSS-REFERENCE TO RELATED APPLICATIONS

This application claims a priority to Chinese Patent Application Serial No. 201710383765.1, filed on May 26, 2017, the entire content of which is incorporated herein by reference for all purposes.

TECHNICAL FIELD

The present disclosure relates to the field of internet technology, and more particularly to a method and a device for distributing an application.

BACKGROUND

With the rapid development of internet technology, more and more people use a terminal application in daily life such as reading articles, planning routes or browsing news. On a desktop of the terminal, there are several displayed applications already installed by a user, when the user clicks into an application, specific contents of the application will be displayed on a screen of the terminal.

SUMMARY

Examples of the present disclosure provide a method, a device and a non-transitory computer-readable storage medium for distributing an application.

In a first aspect of the present disclosure, there is provided a method for distributing an application. The method may include: acquiring a card category of a card to be displayed, where the card includes a download entry of the application and is loaded on a preset desktop and provides a subset of functions of the application; acquiring real-time card information corresponding to the card category according to the card category; and displaying the card in a preset displaying format on the preset desktop based on the real-time card information.

In a second aspect of the present disclosure, there is provided a device for distributing an application. The device may include a processor; and a memory for storing instructions executable by the processor, where the processor may be configured to: acquire a card category of a card to be displayed, where the card includes a download entry of the application and is loaded on a preset desktop, and provides a subset of functions of the application; acquire real-time card information corresponding to the card category according to the card category; and display the card in a preset displaying format on the preset desktop based on the real-time card information.

In a third aspect of the present disclosure, there is provided a computer-readable storage medium having stored therein instructions that, when the instructions are executed by a processor, cause the processor to perform: acquiring a card category of a card to be displayed, where the card includes a download entry of an application and is loaded on a preset desktop, and provides a subset of functions of the application; acquiring real-time card information corresponding to the card category according to the card category; and displaying the card in a preset displaying format on the preset desktop based on the real-time card information.

It should be appreciated that, the general description hereinbefore and the detail description hereinafter are explanatory and illustrative, and shall not be construed to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

Detailed description of the examples will be made herein, with examples thereof to be shown in drawings. In the following descriptions, when the drawings are referred to, unless expressed otherwise, the same number in different drawings refers to the same or similar elements. The examples described in the examples as below do not represent all examples that are consistent with the present disclosure. On the contrary, they are only examples of the devices and the methods that are consistent with some aspects of the present disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

In order to allow the user to use basic functions of a certain application without entering the application, the developer of the application develops a Widget, which is a shortcut display page of the application according to an operating system standard of the terminal and can be added on the desktop. Through the Widget, basic functions of the corresponding application can be achieved conveniently and efficiently, without entering the application.

Widgets of applications may be added on any position of the desktop of the terminal. With the added Widgets, it is convenient for the user to quickly check important information of the applications, such as viewing articles of interest, planning routes, and browsing recommended tourist attractions and so on.

However, Widgets may be designed in different styles by individual application developers, this may lead the desktop of the terminal to have a poor visual effect. Further, the Widget can be added on the desktop and be used only if the user has downloaded and installed the corresponding application, which greatly limits the use of Widget. Therefore, there is a need for a technical solution to distribute applications based on Widgets.

Figure 1:
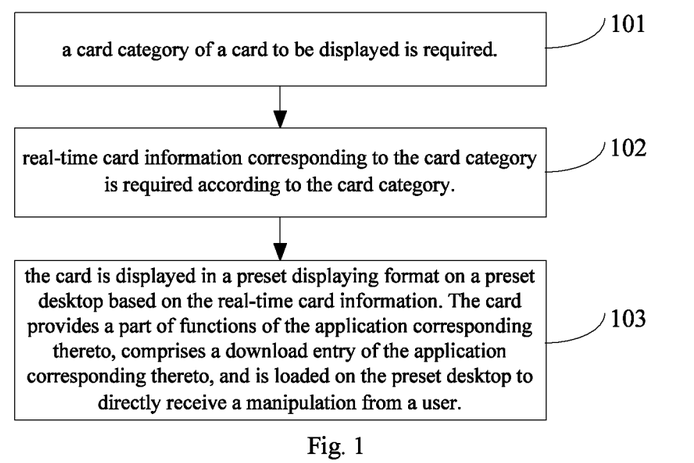
FIG. 1 is a flow chart showing a method for distributing an application, according to an example of the present disclosure.

FIG. 1 is a flow chart showing a method for distributing an application, according to an example of the present disclosure. Referring to FIG. 1, the method includes the following steps.

In block 101, a card category of a card to be displayed is required.

In block 102, real-time card information corresponding to the card category is required according to the card category.

In block 103, the card is displayed in a preset displaying format on a preset desktop based on the real-time card information.

The card provides a part of functions of the application corresponding thereto, includes a download entry of the application corresponding thereto, and is loaded on the preset desktop to directly receive a manipulation from a user.

The card may be referred as an electronic card or an application card. One card may be associated with one application that can run on the mobile terminal and the card may be downloaded to a mobile terminal and may perform a subset of functions that the application can perform. As such, rather than download the whole application to the mobile terminal, a user may just download the card and may only perform the subset of the functions of the application by using the card. This may be useful when all functions of the application are not needed for a mobile terminal.

With the method according to examples of the present disclosure, the real-time card information corresponding to the card category is acquired according to the card category of the card to be displayed, and the card in the preset displaying format is displayed on the preset desktop based on the real-time card information, such that it is possible for the user to use a part of functions of the application corresponding to the card without downloading the application, or to download the application based on the card, without performing complex operations, thereby enhancing utilization of the card, increasing downloads of the application, and expanding the usage range of the application.

In another example of the present disclosure, acquiring real-time card information corresponding to the card category according to the card category includes: sending the card category to a designated server and receiving the real-time card information. The designated server sends back the real-time card information after interacting with an application server corresponding to the card category.

In another example of the present disclosure, the preset displaying format includes: a title part, a content part and a function part. The title part is configured to display the card category. The content part is configured to display the real-time card information. The function part is configured to provide a designated function of the card.

In another example of the present disclosure, the method further includes: jumping to a download page of the application corresponding to the card in an application store when the download entry is triggered.

In another example of the present disclosure, acquiring a card category of a card to be displayed includes: acquiring a card category list including at least one card category of interest set by the user; and acquiring the card category of the card to be displayed from the card category list.

Sometimes, the card category may be set according to the network conditions. For example, when the mobile terminal connects to the Internet network via WiFi, the mobile terminal may connect with the network at a high network speed, the user may want and can use functions of the application that require the high-speed network communication. However, when the mobile terminal connects to the network at the low speed network such as third generation (3G) telecommunication network, the mobile terminal may only perform functions of the application that can be performed under the 3G network. Thus, the card category may be different when the mobile terminal connects to the network via WiFi and when the mobile terminal connects to the network via 3G network.

Sometimes, the user may intentionally pick and choose the card category under different network conditions. For example, when the user connects to the network via telecommunication network, the user may need to pay by the network communication by data transmission volume, thus, the user may not want to choose functions of an application that require high volume data communication, such as the video playing functions. However, when the mobile terminal connects to the network via WiFi, the user may pay for the connection without data transmission volume limit, the user may want to turn on the high data-volume functions of the application such as the video playing functions. Thus, the card category may be selected differently for the mobile terminal when the mobile terminal connects to the network via the WiFi and when the mobile terminal connects to the network via the telecommunication network.

An alternatively example can be obtained by combining the examples described hereinbefore in any way, and will not be elaborated herein.

Figure 2A:
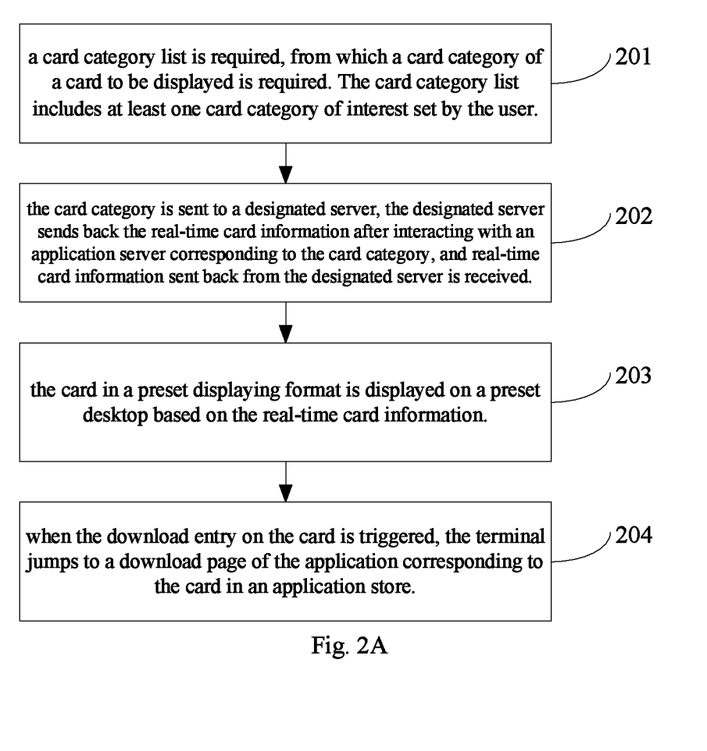
FIG. 2A is a flow chart showing a method for distributing an application, according to an example of the present disclosure.

FIG. 2A is a flow chart showing a method for distributing an application, according to an example of the present disclosure. Referring to FIG. 2A, the method includes the following steps.

In block 201, a card category list is required, from which a card category of a card to be displayed is required. The card category list includes at least one card category of interest set by the user.

Figure 2B:
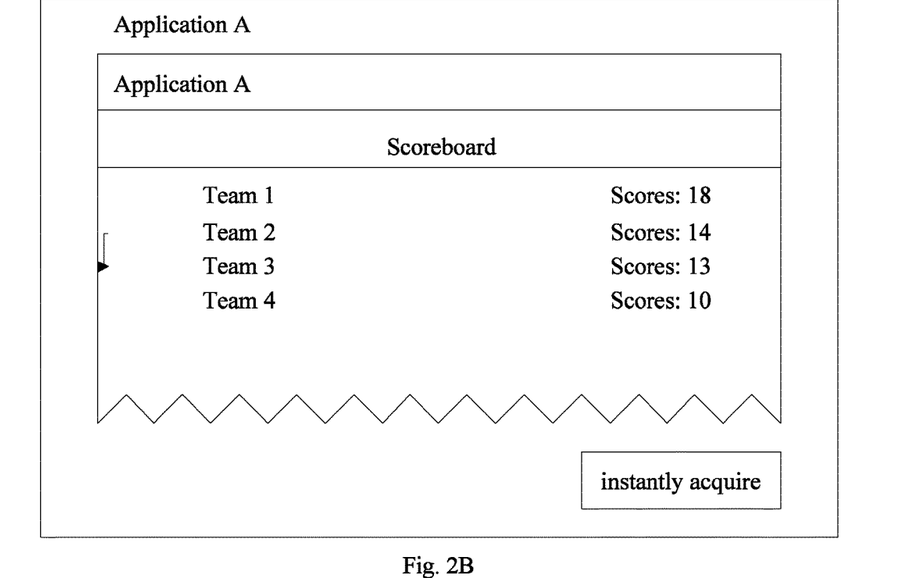
FIG. 2B is a schematic diagram showing a method for distributing an application, according to an example of the present disclosure.

In an example of the present disclosure, for each application in an application store, there is a card corresponding thereto, which provides a part of functions of the application, includes a download entry of the application and can be loaded on a preset desktop to directly receive a manipulation from a user. That is, with the card, the user may use a part of functions of the corresponding application and request to download the corresponding application. For example, referring to FIG. 2B, the preset desktop includes a card of application A, on which the user may check "scoreboard". Moreover, on the card of the application A, there is provided a button indicating "instantly acquire". A terminal will determine that the current user needs to download the application A when detecting that the "instantly acquire" button is triggered by the user and jump to a download page of the application A.

For the user of the terminal, it is hoped that cards displayed on the preset desktop should be those they are interested in. For this, the terminal may provide a card category setting function, based on which the user may select the card category they are interested in, including sports, news, travel and so on. When detecting that the card category setting function is triggered by the user, the terminal may request all the currently included card categories to a designated server and display all the card categories sent back from the designated server, acquire the card categories selected by the user, generate a card category list based on the card categories the user selected, and store the card category list. It should be illustrated that, in order to display the cards on the preset desktop according to the interest degree of the user, the terminal may provide a card displaying priority setting function to allow the user to set the card displaying priority along with the card category such that, subsequently, the cards are displayed in accordance to the card displaying priority and a card the user most interested in is displayed at the top of the preset desktop.

For the terminal, the number of cards to be displayed on the preset desktop may also be set by the user. The terminal may provide a number setting function, and display a number setting page with a number inputting box when detecting the number setting function is triggered, and acquire the number inputted by the user as a preset number of cards to be displayed on the preset desktop. In such a way, the preset number of cards will be displayed on the preset desktop when the user requests to display cards on the preset desktop, avoiding confusion to the user caused by the excessively displayed cards. It should be illustrated that, if the cards in the preset number cannot be displayed all at once, the preset desktop may display some cards in the preset number, and display some other cards in the preset number when the terminal detects a sliding action on the preset desktop, thereby ensuring that the cards in the preset number all can be browsed by the user.

After the process of determining the card category list as described above, when detecting that displaying the present desktop is triggered by the user, the terminal determines that currently it is needed to display cards on the present desktop, at this time, the terminal acquires the already generated card category list, and acquires the card category to be displayed from the card category list, so as to subsequently determine the card to be displayed according to the card category to be displayed.

In block 202, the card category is sent to a designated server, the designated server sends back the real-time card information after interacting with an application server corresponding to the card category, and real-time card information sent back from the designated server is received.

In an example of the present disclosure, the designated server refers to a server to which the terminal is corresponded, i.e. a terminal developer. The application server refers to a server which provides a service for the application, i.e. an application developer. The card of each application is provided by the application server. Therefore, when the terminal displays the real-time card information according to card category, the designated server of the terminal needs to determine the corresponding application according to the card category, determine the application server according to the determined application, request the application server for the real-time card information, and send the real-time card information sent back from the application server to the terminal to allow the terminal to display the real-time card information on the preset desktop.

Before acquiring the card category sent by the terminal, the designated server may store all the card categories and applications according to correspondences between each card category and the application corresponding thereto, wherein the correspondences are preset, such that when the terminal requests to acquire the real-time card information, the server is capable of acquiring the application corresponding to the card category according to the preset correspondences, determining an application server of the acquired application, interacting with the application server, and sending the real-time card information sent back from the application server to the terminal to allow the terminal to display the real-time card information.

The correspondences between each card category and the application corresponding thereto may also be stored in the terminal, in such a way, when detecting that displaying the preset desktop is triggered by the user, the terminal is capable of determining one or more applications according to one or more card categories in the card category list, sending application identifiers of the applications to the designated server. The designated server determines application servers of the applications according to the application identifiers, requests the application servers for real-time card information, and sends the real-time card information sent back from the application servers to the terminal to allow the terminal to display the real-time card information.

It should be illustrated that, for each card category, there may be one application corresponding thereto. Therefore, when interacting with the application server based on the card category, the designated server is capable of determining the application server directly according to the application corresponding to card category, and requesting the application server for the real-time card information.

In block 203, the card in a preset displaying format is displayed on a preset desktop based on the real-time card information.

In examples of the preset disclosure, the preset desktop is configured to display the card including the real-time card information. The preset desktop may be a hiboard of the terminal, which is an additional page in addition to several currently displayable pages of the terminal and is configured to display the card and the real-time card information and to provide simple service. The preset desktop may be in other forms, which are not specifically limited by the present disclosure.

For the card, it can only be displayed and operated on the preset desktop. The cards are overall set with a preset displaying format, i.e., all the cards to be displayed on the preset desktop are in the preset displaying format. The preset displaying format is set by the terminal developer, and is configured to specify the displaying form of the cards developed by application developer. After setting the preset displaying format, the terminal developer will send the preset displaying format to the application developer. The application developer designs cards according to the preset displaying format and sends the designed cards back to the designated server.

The designated server further sends the designed cards to the terminal to allow the terminal to display the cards. The preset displaying format may include: a title part, a content part and a function part. The title part is configured to display the card category. The content part is configured to display the real-time card information. The function part is configured to provide a designated function of the card. For example, referring to the card as shown in FIG. 2C, for this card, the title part is "application B", which means the card category of the card is application B; the content part includes "university computer foundation", "main building C108", "advanced mathematics 2" and "east eight teaching building A106", which shows the real-time card information of the card; and the function part is shown as a triangle at right side, by sliding on which the user may obtain more course information.

Figure 2C:
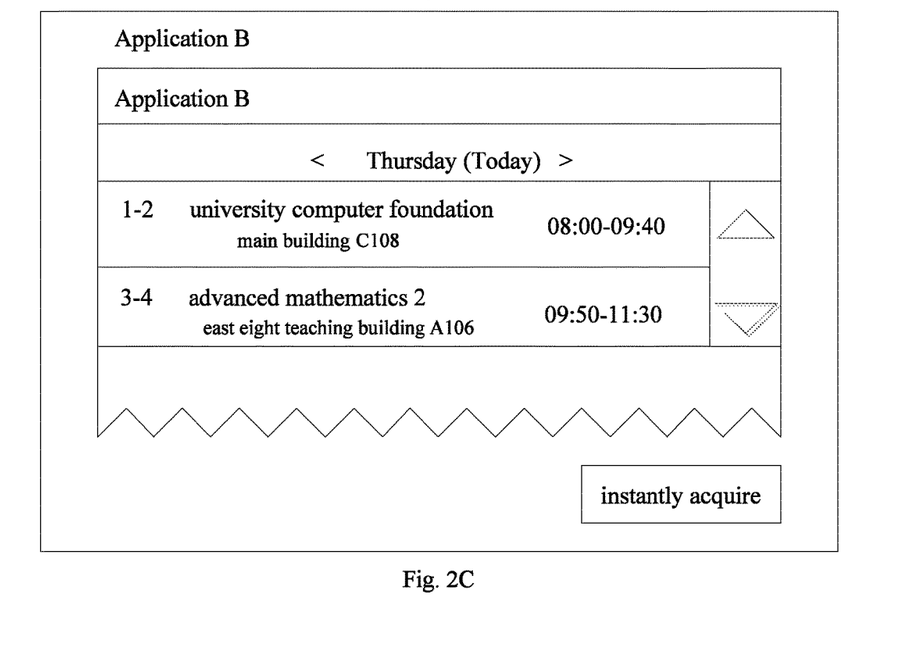
FIG. 2C is a schematic diagram showing a method for distributing an application, according to an example of the present disclosure.

It should be illustrated that, an "instantly acquire" button as shown in FIG. 2C is a download entry of an application. When detecting that the "instantly acquire" button is triggered, the terminal will jump to a download page of the application B in the application store, where the user may download the application B. For an application already installed in the terminal, when the real-time card information is displayed on the corresponding card, the download entry of the application may be omitted, while an "access" button is added. When it is detected that the "open" button is triggered, the user will open the application and may use all functions of the application.

During actual application, the download entry of the application provided based on the card by the terminal may also be "view more information". The part of functions of the application provided on the corresponding card may not satisfy the needs of the user, and the user may want to acquire more functions and information of the application after using the part of functions on the card, based on this consideration, the "view more information" button may be set on the card. When detecting that this button is triggered by the user, the terminal will jump to the download page of the application in the application store. The user may then download the application from the download page so as to acquire more information of the application. In addition, in such a case that the application has already been installed in the terminal, when it is detected that the "view more information" button is triggered by the user, the user will open the application.

In block 204, when the download entry on the card is triggered, the terminal jumps to a download page of the application corresponding to the card in an application store.

In an example of the present disclosure, the application store is provided by the designated server to which the terminal is corresponded, i.e., provided by the terminal developer. The application developer may send a download link of the application to the designated server of the terminal developer, and the designated server includes the download link of the application to the application store. Based on the download page of the application provided by the application store, the terminal may ensure the user to download the application from the download page of the application. For each card, before the card is used, the terminal needs to bind the card and the download page of the corresponding application in the application store, such that the terminal is capable of jumping directly from the card on the preset desktop to the download page of the application corresponding to the card in the application store when detecting that the download entry on the card is triggered, so as to achieve the distribution of the application based on the card of the application. As the user may directly perform an operation on the card, the terminal is capable of jumping directly from the card to the download page of the application corresponding to the card, without other intermediate processes performed by the user, such as searching the application in the application store, therefore, for the application, its download conversion rate will be increased. Furthermore, more users will download the application directly based on the card after using the part of functions of the application on the card, thereby increasing downloads of the application and expanding the usage range of the application.

Figure 2D:
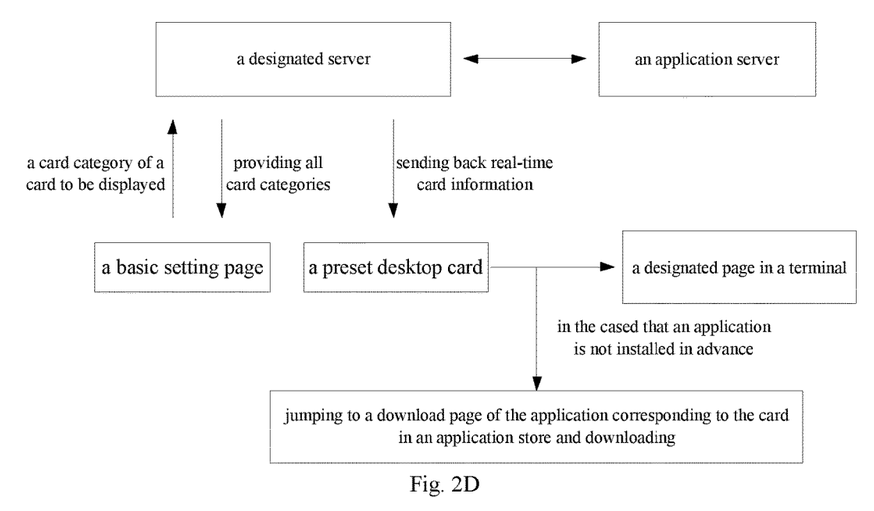
FIG. 2D is a schematic diagram showing a method for distributing an application, according to an example of the present disclosure.

During actual application, referring to FIG. 2D, the terminal may achieve distribution of an application based on processes as shown in FIG. 2D: the terminal may acquire all card categories provided by a designated server, and generate a basic setting page based on the card categories and display the basic setting page on which a card category setting function is provided; the terminal acquires a card category of a card to be displayed which is set on the basic setting page by the user and generates a card category list, uploads the card category list to the designated server which sends back real-time card information to the terminal based on the card category list, and displays the real-time card information on a preset desktop; the terminal jumps to the download page of the application corresponding to the card in the application store when detecting that the download entry on the card is triggered; for an already downloaded application, when detecting that acquiring more information of the application is triggered by the user, the terminal may jump from the card of the application to a designated page of the application to allow the user to acquire more information of the application.

With the method according to examples of the present disclosure, the real-time card information corresponding to the card category is acquired according to the card category of the card to be displayed, and the card in the preset displaying format is displayed on the preset desktop based on the real-time card information, such that it is possible for the user to use a part of functions of the application corresponding to the card without downloading the application, or to download the application based on the card, without performing complex operations, thereby enhancing utilization of the card, increasing downloads of the application, and expanding the usage range of the application.

Figure 3A:
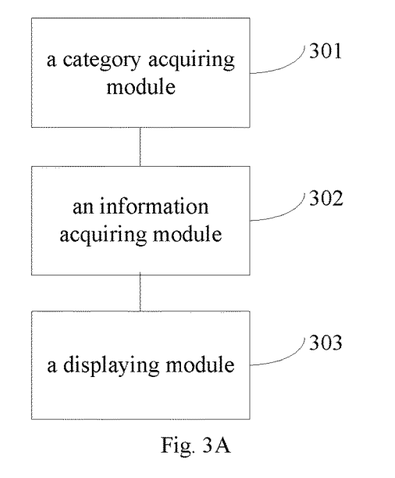
FIG. 3A is a block diagram showing a device for distributing an application, according to an example of the present disclosure.

FIG. 3A is a block diagram showing a device for distributing an application, according to an example of the present disclosure. Referring to FIG. 3A, the device includes a category acquiring module 301, an information acquiring module 302 and a displaying module 303.

The category acquiring module 301 is configured to acquire a card category of a card to be displayed.

The information acquiring module 302 is configured to acquire real-time card information corresponding to the card category according to the card category.

The displaying module 303 is configured to display the card in a preset displaying format on a preset desktop based on the real-time card information.

The card provides a part of functions of the application corresponding thereto, includes a download entry of the application corresponding thereto, and is loaded on the preset desktop to directly receive a manipulation from a user.

With the device according to examples of the present disclosure, the real-time card information corresponding to the card category is acquired according to the card category of the card to be displayed, and the card in the preset displaying format is displayed on the preset desktop based on the real-time card information, such that it is possible for the user to use a part of functions of the application corresponding to the card without downloading the application, or to download the application based on the card, without performing complex operations, thereby enhancing utilization of the card, increasing downloads of the application, and expanding the usage range of the application.

Figure 3B:
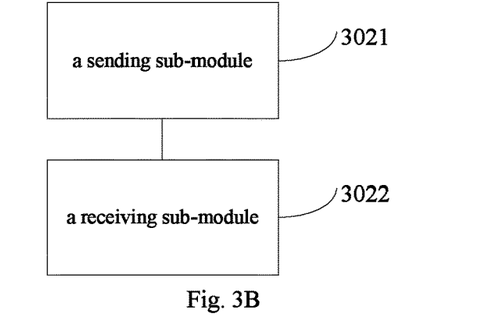
FIG. 3B is a block diagram showing a device for distributing an application, according to an example of the present disclosure.

In another example of the present disclosure, referring to FIG. 3B, the information acquiring module 302 includes a sending sub-module 3021 and a receiving sub-module 3022.

The sending sub-module 3021 is configured to send the card category to a designated server.

The designated server sends back the real-time card information after interacting with an application server corresponding to the card category.

The receiving sub-module 3022 is configured to receive the real-time card information.

In another example of the present disclosure, the preset displaying format includes: a title part, a content part and a function part. The title part is configured to display the card category. The content part is configured to display the real-time card information. The function part is configured to provide a designated function of the card.

Figure 3C:
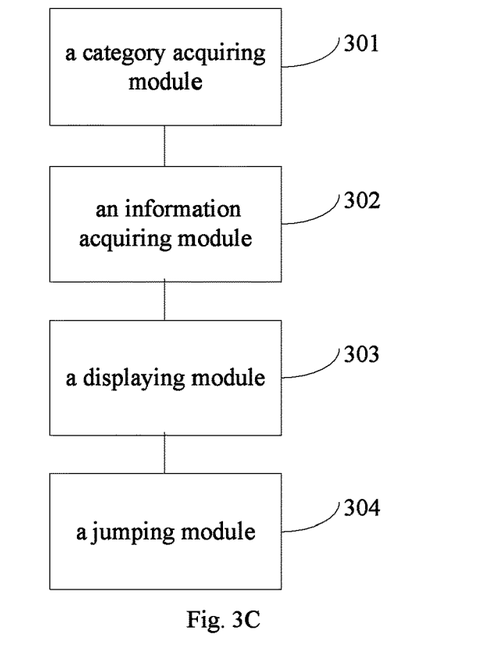
FIG. 3C is a block diagram showing a device for distributing an application, according to an example of the present disclosure.

In another example of the present disclosure, referring to FIG. 3C, the device further includes a jumping module 304.

The jumping module 304 is configured to jump to a download page of the application corresponding to the card in an application store when the download entry is triggered.

Figure 3D:
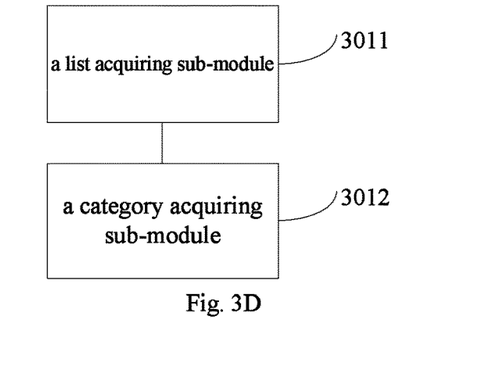
FIG. 3D is a block diagram showing a device for distributing an application, according to an example of the present disclosure.

In another example of the present disclosure, referring to FIG. 3D, the category acquiring module 301 includes a list acquiring sub-module 3011 and a category acquiring sub-module 3012.

The list acquiring sub-module 3011 is configured to acquire a card category list. The card category list includes at least one card category of interest set by the user.

The category acquiring sub-module 3012 is configured to acquire the card category of the card to be displayed from the card category list.

With respect to the devices in the above examples, the specific manners for performing operations for individual modules therein have been described in detail in the examples regarding the methods, which will not be elaborated herein.

Figure 4:
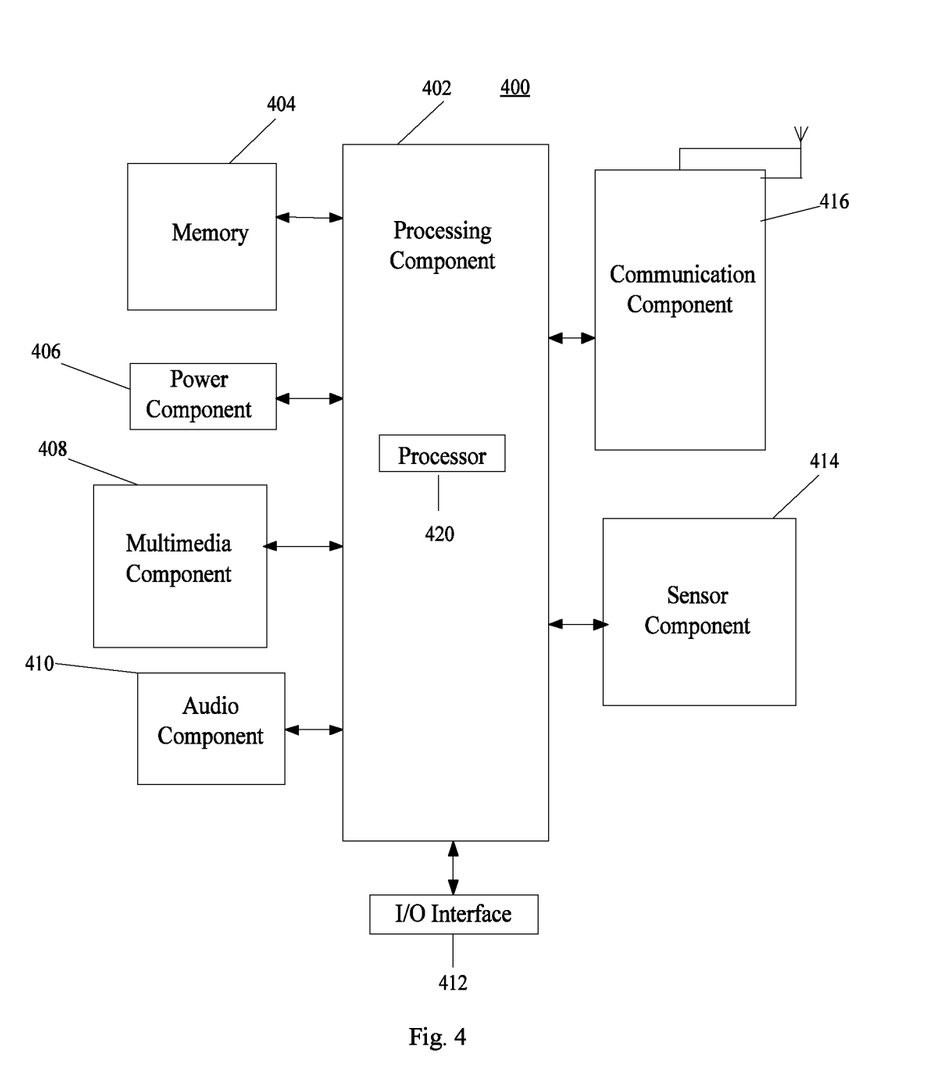
FIG. 4 is a block diagram showing a device 400 for distributing an application, according to an example of the present disclosure.

FIG. 4 is a block diagram showing a device 400 for distributing an application, according to an example of the present disclosure. For example, the device 400 may be a mobile phone, a computer, a digital broadcast terminal, a messaging device, a gaming console, a tablet, a medical device, exercise equipment, a personal digital assistant, and the like.

Referring to FIG. 4, the device 400 may include one or more of the following components: a processing component 402, a memory 404, a power component 406, a multimedia component 408, an audio component 410, an input/output (I/O) interface 412, a sensor component 414, and a communication component 416.

The processing component 402 typically controls overall operations of the device 400, such as the operations associated with display, telephone calls, data communications, camera, and record. The processing component 402 may include one or more processors 420 to execute instructions to perform all or part of the steps in the above described methods. Moreover, the processing component 402 may include one or more modules which facilitate(s) the interaction between the processing component 402 and other components. For instance, the processing component 402 may include a multimedia module to facilitate the interaction between the multimedia component 408 and the processing component 402.

The memory 404 is configured to store various types of data to support the operation of the device 400. Examples of such data include instructions for any applications or methods operated on the device 400, such as contact data, phonebook data, messages, pictures, video, and the like. The memory 404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk and a compact disc.

The power component 406 provides power to various components of the device 400. The power component 406 may include a power management system, one or more power sources, and any other components associated with the generation, management, and distribution of power for the device 400.

The multimedia component 408 includes a screen providing an output interface between the device 400 and the user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some examples, the multimedia component 408 includes a front camera and/or a rear camera. The front camera and the rear camera may receive an external multimedia datum while the device 400 is in an operation mode, such as a photographing mode and a video mode. Each of the front camera and the rear camera may be a fixed optical lens system or have focus and optical zoom capability.

The audio component 410 is configured to output and/or input audio signals. For example, the audio component 410 includes a microphone ("MIC") configured to receive an external audio signal when the device 400 is in an operation mode, such as a call mode, a recording mode, and a voice recognition mode. The received audio signal may be further stored in the memory 404 or transmitted via the communication component 416. In some examples, the audio component 410 further includes a speaker to output audio signals.

The I/O interface 412 provides an interface between the processing component 402 and peripheral interface modules, such as a keyboard, a click wheel, buttons, and the like. The buttons may include, but are not limited to, a home button, a volume button, a starting button, and a locking button.

The sensor component 414 includes one or more sensors to provide status assessments of various aspects of the device 400. For instance, the sensor component 414 may detect an open/closed status of the device 400, relative positioning of components, e.g., the display and the keypad, of the device 400, a change in position of the device 400 or a component of the device 400, a presence or absence of user contact with the device 400, an orientation or an acceleration/deceleration of the device 400, and a change in temperature of the device 400. The sensor component 414 may include a proximity sensor configured to detect the presence of nearby objects without any physical contact. The sensor component 414 may also include a light sensor, such as a CMOS or CCD image sensor, for use in imaging applications. In some examples, the sensor component 414 may also include an accelerometer sensor, a gyroscope sensor, a magnetic sensor, a pressure sensor, or a temperature sensor.

The communication component 416 is configured to facilitate communication, wired or wirelessly, between the device 400 and other devices. The device 400 can access a wireless network based on a communication standard, such as WiFi, 2G, or 3G, or a combination thereof. In one example, the communication component 416 receives a broadcast signal or broadcast associated information from an external broadcast management system via a broadcast channel. In one example, the communication component 416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples, the device 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In examples, there is also provided a non-transitory computer-readable storage medium including instructions, such as included in the memory 404, executable by the processor 420 in the device 400, for performing the above-described methods. For example, the non-transitory computer-readable storage medium may be a ROM, a RAM, a CD-ROM, a magnetic tape, a floppy disc, an optical data storage device, and the like.

In examples, there is also provided a non-transitory computer-readable storage medium having stored therein instructions that, when executed by a processor of a device for distributing an application, causes device to perform a method for distributing an application as described hereinbefore.

In examples, there is also provided a computer-readable storage medium having stored therein instructions that, when executed by a processor, causes the processor to perform a method for distributing an application as described hereinbefore.

In examples, there is also provided a computer device, including a memory, a processor, and a computer executable instruction stored in the memory and executable by the processor, wherein when the processor executes the computer executable instruction, a method for distributing an application as described hereinbefore is achieved.

Examples of the present disclosure provide a method and device for distributing an application.

In a first aspect of examples of the present disclosure, there is provided a method for distributing an application, including: acquiring a card category of a card to be displayed; acquiring real-time card information corresponding to the card category according to the card category; and displaying the card in a preset displaying format on a preset desktop based on the real-time card information, wherein the card provides a part of functions of the application corresponding thereto, includes a download entry of the application corresponding thereto, and is loaded on the preset desktop to directly receive a manipulation from a user.

In a second aspect of examples of the present disclosure, there is provided a device for distributing an application, including: a category acquiring module, configured to acquire a card category of a card to be displayed; an information acquiring module, configured to acquire real-time card information corresponding to the card category according to the card category; and a displaying module, configured to display the card in a preset displaying format on a preset desktop based on the real-time card information, wherein the card provides a part of functions of the application corresponding thereto, includes a download entry of the application corresponding thereto, and is loaded on the preset desktop to directly receive a manipulation from a user.

In a third aspect of examples of the present disclosure, there is provided a device for distributing an application, including: a processor; and a memory for storing instructions executable by the processor, wherein the processor is configured to: acquire a card category of a card to be displayed; acquire real-time card information corresponding to the card category, according to the card category; and display the card in a preset displaying format on a preset desktop based on the real-time card information, wherein the card provides a part of functions of the application corresponding thereto, includes a download entry of the application corresponding thereto, and is loaded on the preset desktop to directly receive a manipulation from a user.

In a fourth aspect of examples of the present disclosure, there is provided a computer-readable storage medium having stored therein instructions that, when executed by a processor, causes the processor to perform the method for distributing an application described hereinbefore.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

Other examples of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only.

It will be appreciated that the present disclosure is not limited to the exact construction that has been described above and illustrated in the accompanying drawings, and that various modifications and changes can be made without departing from the scope thereof.

What is claimed is:

1. A method for performing a subset of functions of an application by a device, comprising:
   acquiring a card category of a card to be displayed, wherein the card to be displayed is associated with the application, and provides the subset of functions of the application;
   acquiring real-time card information of the card to be displayed according to the card category; and
   loading and displaying the card in a preset displaying format on Ma a preset desktop based on the real-time card information, where the subset of functions of the application is performed by using the card without downloading the application;
   wherein the preset displaying format of the card comprises:
      a title part configured to display the card category;
      a content part configured to display the real-time card information; and
      a function part configured to provide a designated function of the card; and
   wherein the device binds the card and a download page of the application in an application store before the card is used; and wherein the device jumps directly from the card on the preset desktop to the download page of the application corresponding to the card in the application store when detecting that a download entry on the card is triggered.

2. The method according to claim 1, wherein acquiring the real-time card information of the card to be displayed according to the card category comprises:
   sending the card category to a designated server, wherein the designated server sends back the real-time card information after interacting with an application server corresponding to the card category; and
   receiving the real-time card information.

3. The method according to claim 1, wherein acquiring the card category of the card to be displayed comprises:
   acquiring a card category list comprising at least one card category of interest set by a user; and
   acquiring the card category of the card to be displayed from the card category list.

4. A device for performing a subset of functions of an application, comprising:
   a processor; and
   a memory for storing instructions executable by the processor,
   wherein the processor is configured to:
   acquire a card category of a card to be displayed, wherein the card to be displayed is associated with the application, and provides the subset of functions of the application;
   acquire real-time card information of the card to be displayed according to the card category; and
   load and display the card in a preset displaying format on a preset desktop based on the real-time card information, where the subset of functions of the application is performed by using the card without downloading the application;
   wherein the preset displaying format of the card comprises:
      a title part configured to display the card category;
      a content part configured to display the real-time card information; and
      a function part configured to provide a designated function of the card; and
   wherein the device binds the card and a download page of the application in an application store before the card is used; and wherein the device is capable of jumping directly from the card on the preset desktop to the download page of the application corresponding to the card in the application store when detecting that a download entry on the card is triggered.

5. The device according to claim 4, wherein the processor configured to acquire the real-time card information of the card to be displayed according to the card category is further configured to:
   send the card category to a designated server, wherein the designated server sends back the real-time card information after interacting with an application server corresponding to the card category; and
   receive the real-time card information.

6. The device according to claim 4, wherein the processor configured to acquire the card category of the card to be displayed is further configured to:
   acquire a card category list comprising at least one card category of interest set by a user; and
   acquire the card category of the card to be displayed from the card category list.

7. A non-transitory computer-readable storage medium having stored therein instructions that, when the instructions are executed by a processor, cause the processor to perform:
   acquiring a card category of a card to be displayed, wherein the card to be displayed is associated with an application, and provides a subset of functions of the application;
   acquiring real-time card information of the card to be displayed according to the card category; and
   loading and displaying the card in a preset displaying format on Ma a preset desktop based on the real-time card information, where the subset of functions of the application is performed by using the card without downloading the application;
   wherein the preset displaying format of the card comprises:
      a title part configured to display the card category;
      a content part configured to display the real-time card information; and
      a function part configured to provide a designated function of the card; and
   binding the card and a download page of the application in an application store before the card is used; and enabling the device to jump directly from the card on the preset desktop to the download page of the application corresponding to the card in the application store when detecting that a download entry on the card is triggered.

8. The non-transitory computer-readable storage medium according to claim 7, wherein the instructions caused the processor to perform acquiring the real-time card information of the card to be displayed according to the card category further cause the processor to perform:
   sending the card category to a designated server, wherein the designated server sends back the real-time card information after interacting with an application server corresponding to the card category; and
   receiving the real-time card information.

9. The non-transitory computer-readable storage medium according to claim 7, wherein the instructions caused the processor to perform acquiring the card category of the card to be displayed further cause the processor to perform:
   acquiring a card category list comprising at least one card category of interest set by a user; and
   acquiring the card category of the card to be displayed from the card category list.

\* \* \* \* \*